United States Patent
Sato

(10) Patent No.: US 10,372,019 B2
(45) Date of Patent: Aug. 6, 2019

(54) LENS DRIVING ADAPTER, LENS APPARATUS AND IMAGE CAPTURING APPARATUS

(71) Applicant: CANON KABUSHIKI KAISHA, Tokyo (JP)

(72) Inventor: Katsuhiko Sato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 15/196,522

(22) Filed: Jun. 29, 2016

(65) Prior Publication Data

US 2017/0003474 A1 Jan. 5, 2017

(30) Foreign Application Priority Data

Jun. 30, 2015 (JP) ................... 2015-130653

(51) Int. Cl.
| | |
|---|---|
| G02B 7/02 | (2006.01) |
| G03B 13/32 | (2006.01) |
| G02B 7/10 | (2006.01) |
| G03B 3/10 | (2006.01) |
| G03B 17/56 | (2006.01) |

(52) U.S. Cl.
CPC ............ G03B 13/32 (2013.01); G02B 7/10 (2013.01); G03B 3/10 (2013.01); G03B 17/56 (2013.01); *G03B 2205/0046* (2013.01)

(58) Field of Classification Search
CPC ...................................... G03B 13/32
USPC ....................................... 359/823
See application file for complete search history.

(56) References Cited

U.S. PATENT DOCUMENTS

| | | | | |
|---|---|---|---|---|
| 6,035,137 A | * | 3/2000 | Kaneko | G02B 7/10 396/76 |
| 6,130,715 A | * | 10/2000 | Matsui | G02B 7/10 348/345 |
| 2015/0138437 A1 | | 5/2015 | Matsuura et al. | |

FOREIGN PATENT DOCUMENTS

| | | |
|---|---|---|
| JP | H02-285311 A | 11/1990 |
| JP | 2001074993 A | 3/2001 |
| JP | 2007108373 A | 4/2007 |

OTHER PUBLICATIONS

Office Action issued in Japanese Appln. No. 2015-130653 dated Mar. 26, 2019. English translation provided.

* cited by examiner

*Primary Examiner* — James C. Jones
(74) *Attorney, Agent, or Firm* — Rossi, Kimms & McDowell LLP

(57) ABSTRACT

The lens driving adapter is detachably attachable to a lens barrel on which an operation member is provided. The adapter includes a driver configured to drive the operation member, and an adapter body holding the driver. The adapter body includes a first contact portion and a second contact portion that are protrusions contactable with two circumferential portions in an outer circumferential surface of the lens barrel. The first and the second contact portions are contactable with outer circumferential surfaces of lens barrels whose outer diameters are mutually different. The adapter body includes a fixing member configured to fix the adapter body to any of the lens barrels.

12 Claims, 4 Drawing Sheets

LENS DRIVING ADAPTER, LENS APPARATUS AND IMAGE CAPTURING APPARATUS

BACKGROUND OF THE INVENTION

Field of the Invention

The present invention relates to a to a lens driving adapter detachably attachable to a lens barrel and able to drive an operation member of the lens barrel.

Description of the Related Art

Lens barrels are mostly provided with an operation member such as an operation ring operable by a user for manual zooming or manual focusing. Japanese Patent Laid-Open No. 2007-108373 discloses a lens driving adapter detachably attachable to a lens barrel and configured to electrically drive, using an actuator, an operation member provided on the lens barrel.

However, the lens driving adapter disclosed in Japanese Patent Laid-Open No. 2007-108373 is attachable only to a lens barrel having a limited outer diameter. On the other hand, lens barrels have various outer diameters, and thereby a lens driving adapter widely attachable to such lens barrels having mutually different outer diameters is desirable to be provided.

SUMMARY OF THE INVENTION

The present invention provides a lens driving adapter widely attachable to lens barrels having mutually different outer diameters. The present invention further provides a lens apparatus and an image capturing apparatus to which the lens driving adapter is detachably attachable.

The present invention provides as an aspect thereof a lens driving adapter detachably attachable to a lens barrel on which an operation member is provided. The adapter includes a driver configured to drive the operation member, and an adapter body holding the driver. The adapter body includes a first contact portion and a second contact portion that are protrusions contactable with two circumferential portions in an outer circumferential surface of the lens barrel, the first and the second contact portions are contactable with outer circumferential surfaces of lens barrels whose outer diameters are mutually different, and the adapter body includes a fixing member configured to fix the adapter body to any of the lens barrels.

The present invention provides as another aspect thereof a lens apparatus that an operation member is provided on a lens barrel and that the above lens driving adapter is detachably attachable to the lens barrel.

The present invention provides as yet another aspect thereof an image capturing apparatus that an operation member is provided on a lens barrel and that the above lens driving adapter is detachably attachable to the lens barrel.

Further features and aspects of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 2:
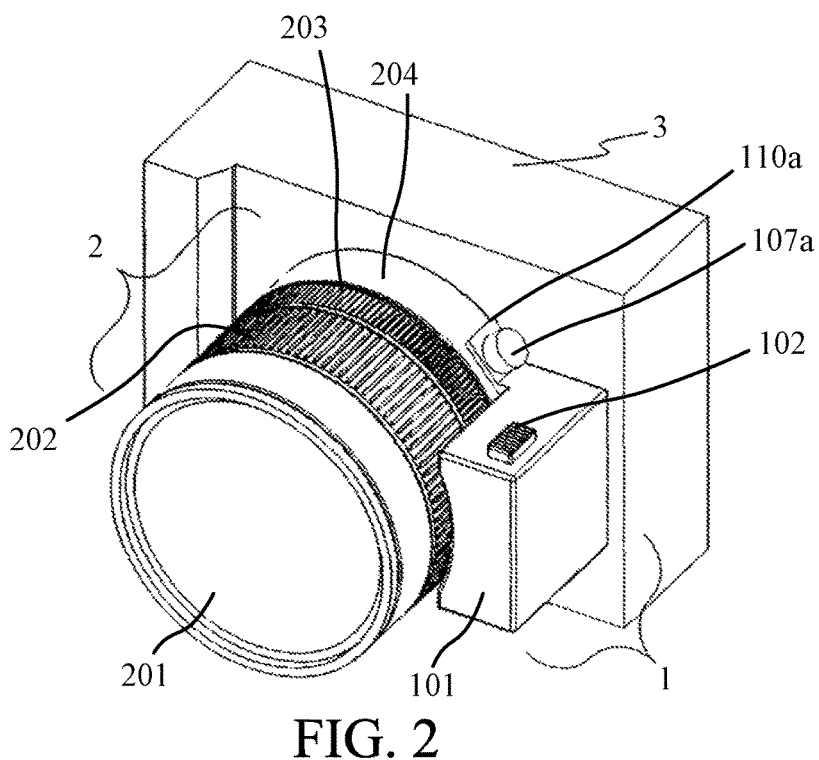
FIG. 2 is an external perspective view of a lens-interchangeable camera system in which the lens driving adapter of Embodiment 1 is attached to the lens barrel.
Figure 3:
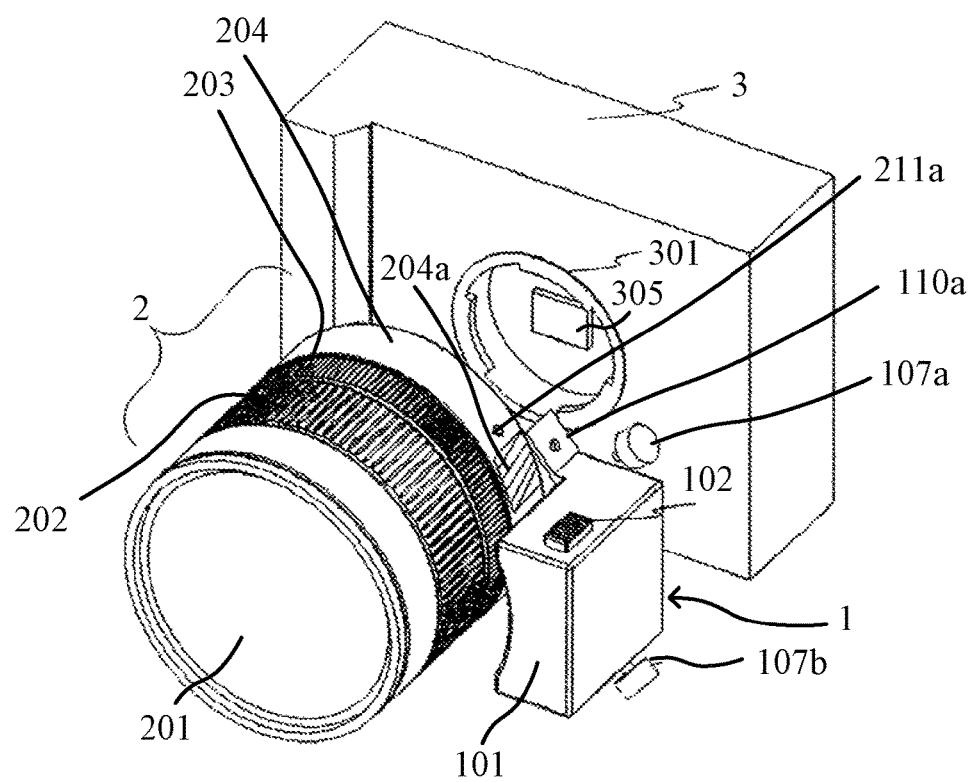
FIG. 3 is an external perspective view of the lens-interchangeable camera system in which the lens driving adapter of Embodiment 1 is detached from the lens barrel.

FIG. 2 illustrates a lens driving adapter 1 that is a first embodiment (Embodiment 1) of the present invention, a lens barrel that constitutes a body of an interchangeable lens (lens apparatus) to which the lens driving adapter 1 is attached and a lens-interchangeable digital camera (image capturing apparatus) 3 to which the lens barrel 2 is attached. The lens driving adapter 1 is detachably attachable to the lens barrel 2. FIG. 3 illustrates the lens driving adapter 1 detached from the lens barrel 2 and the lens barrel 2 detached from the camera 3.

As illustrated in FIG. 3, the camera 3 is provided with a mount 301. The lens barrel 2 is detachably attachable to the mount 301. The camera 3 is further provided thereinside with an image sensor 305 behind the mount 301. The image sensor 305 photoelectrically converts (captures) an object image formed by an image capturing optical system described below.

The lens barrel 2 illustrated in FIGS. 2 and 3 houses thereinside the image capturing optical system 201 including lenses and an aperture stop.

On the other hand, the lens barrel 2 is further provided, on its outer circumferential surface 204, with a lens operation ring 202 as an operation member. The lens operation ring 202 is rotatable about an optical axis of the lens barrel 2 in a circumferential direction of the lens barrel 2. Rotating the lens operation ring 202 enables moving at least one of the lenses included in the image capturing optical system 201 in a direction along the optical axis (hereinafter referred to as "an optical axis direction") to vary a focal length and perform focusing.

The lens operation ring 202 is provided with a driven gear 203 as a driven portion at its part in the optical axis direction. The driven gear 203 is formed so as to extend in the circumferential direction.

The lens driving adapter 1 includes a case 101 constituting an adapter body and an operation switch 102 provided on a top face of the case 101.

Figure 1:
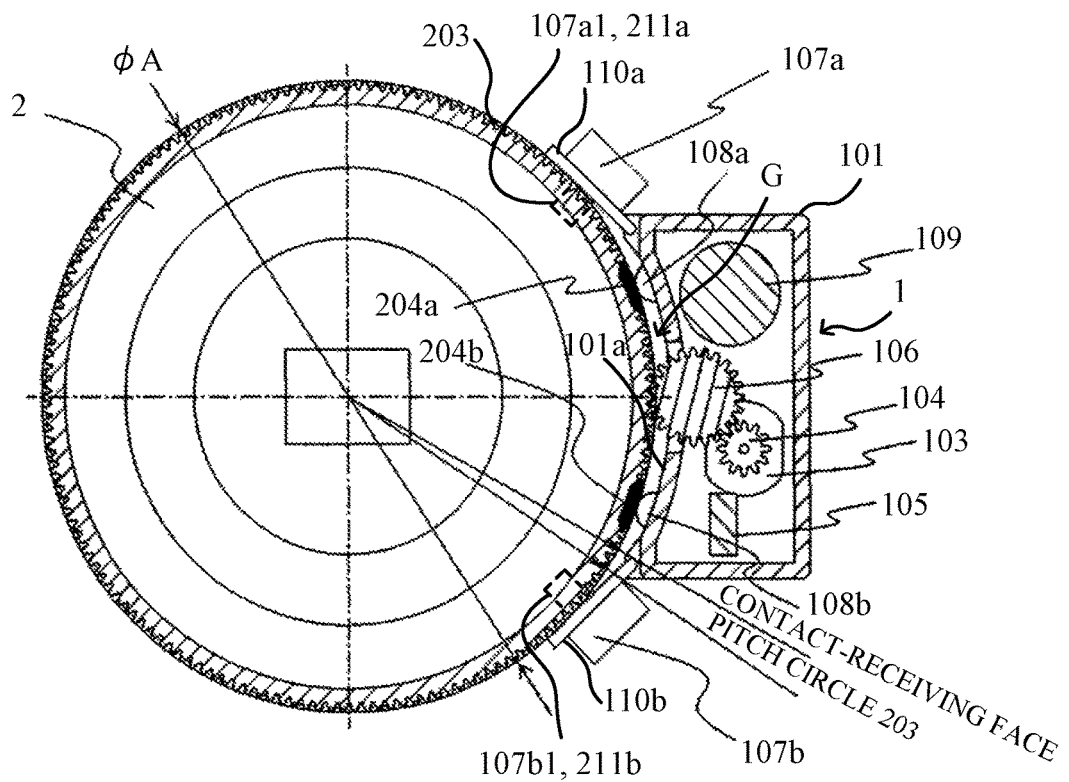
FIG. 1 is a sectional view of configurations of a lens driving adapter that is Embodiment 1 of the present invention and a lens barrel to which the lens driving adapter is attached.

FIG. 1 illustrates a section of the lens driving adapter 1 and the lens barrel 2 to which the lens driving adapter 1 is attached, when cut in a direction orthogonal to the optical axis of the lens barrel 2.

The case 101 houses thereinside and holds a driver including a driving source 103 such as a DC motor, a stepping motor or a piezoelectric element, a ring driving gear 106 as a driving member and a transmitting gear 104 configured to transmit a driving force from the driving source 103 to the ring driving gear 106.

The case 101 further houses thereinside a drive controller 105 configured to control a driving direction, a driving speed, a driving period of time and others of the driving source 103 in response to a user's operation of the operation switch 102. The ring driving gear 106 meshes (makes contact) with the driven gear 203 of the lens operation ring 202 in a state where the lens driving adapter 1 is attached to the lens barrel 2. Thus, the ring driving gear 106 rotated by the driving force from the driving source 103 rotates the lens operation ring 202.

Although this embodiment uses the ring driving gear 106 as the driving member, other driving members may be used that make contact with and drive the lens operation ring 202, such as a roller and a belt.

The case 101 still further houses thereinside a battery 109. When the lens driving adapter 1 receives power from the lens barrel 2 or the camera 3, the battery 109 may be removed.

The case 101 has a lens attachment surface 101a formed as a circular-arc concave curved surface portion so as to prevent interference with the outer circumferential surface 204 of the lens barrel 2. The lens attachment surface 101a extends along, that is, faces the outer circumferential surface 204 of the lens barrel 2 in the state where the lens driving adapter 1 is attached to the lens barrel 2.

In the following description, a direction corresponding to the circumferential direction of the lens barrel 2 disposed along the lens attachment surface 101a is referred to also in the lens driving adapter 1 as "a circumferential direction", and a direction corresponding to the optical axis direction of the lens barrel 2 disposed along the lens attachment surface 101a is referred to also in the lens driving adapter 1 as "an optical axis direction".

The case 101 has, on the lens attachment surface 101a, two contact portions (first and second contact portions) 108a and 108b as two protrusions circumferentially separate from each other. These contact portions 108a and 108b are respectively contactable to contact-receiving faces 204a and 204b on the outer circumferential surface 204 of the lens barrel 2. In this embodiment, each of the contact portions 108a and 108b is formed in a protruding shape having a partial cylindrical surface (convex curved surface) that extends in the optical axis direction.

The contact portions 108a and 108b may be formed in a shape having a vertex, such as a triangle. However, in order to prevent a deformation of the outer circumferential surface 204 of the lens barrel 2 when the lens driving adapter 1 is attached thereto or when receiving impact due to fall, the contact portions 108a and 108b are desirable to be formed in the above-mentioned shape having the partial cylindrical surface.

Furthermore, in this embodiment, the contact portions 108a and 108b are formed on both sides of the ring driving gear 106 in the circumferential direction.

The lens driving adapter 1 of this embodiment is attachable to multiple lens barrels whose outer circumferential surfaces have mutually different outer diameters. FIG. 1 illustrates a case where the lens driving adapter 1 is attached to the lens barrel 2 whose outer diameter is φA.

Figure 4B:
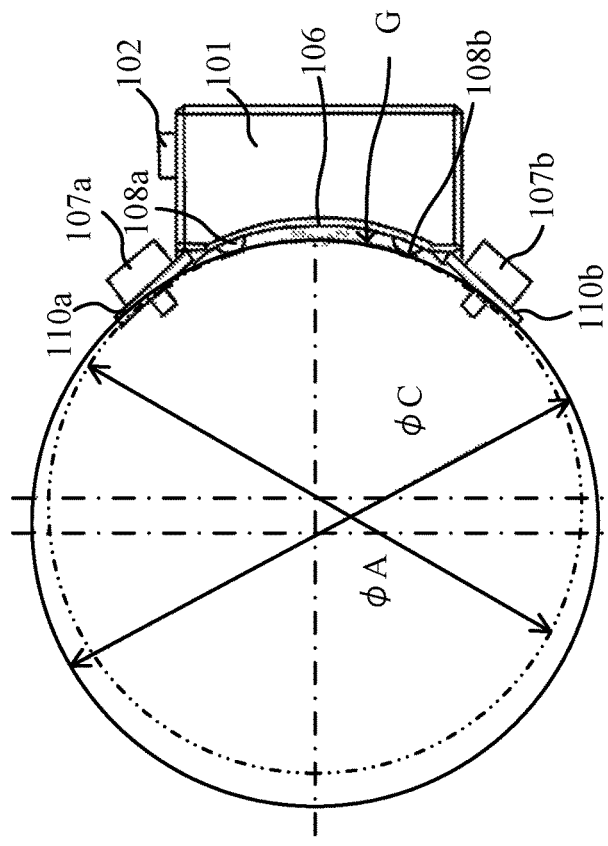
FIGS. 4A and 4B illustrate relations between the lens driving adapter of Embodiment 1 and lens barrels having mutually different outer diameters.
Figure 4A:
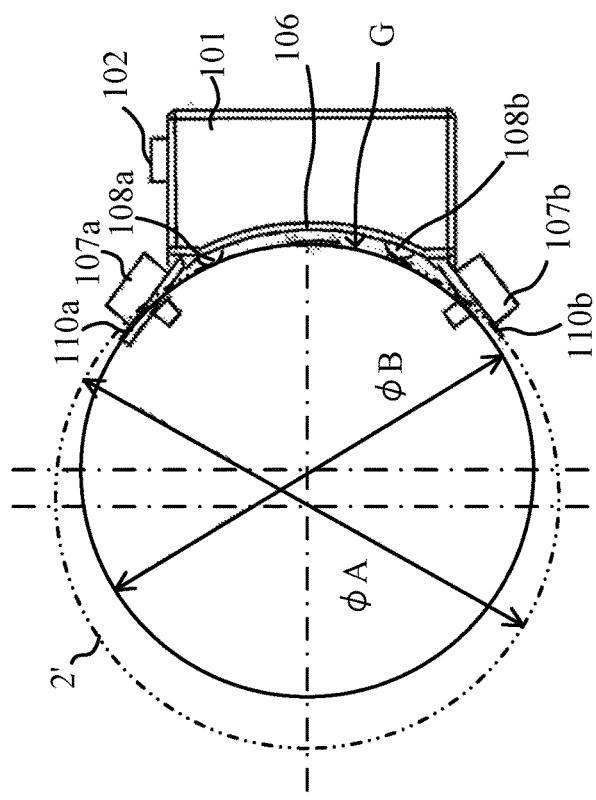

On the other hand, FIG. 4A illustrates a case where the lens driving adapter 1 is attached to another lens barrel 2' whose outer diameter is φB smaller than φA. FIG. 4B illustrates a case where the lens driving adapter 1 is attached to further another lens barrel 2" whose outer diameter is φC larger than φA.

In FIGS. 1, 4A and 4B, the case 101 is provided, at its circumferential both side portions, with two movable plates (first and second movable member) 110a and 110b movably attached or connected to the case 101. The movable plates 110a and 110b are attached or connected to the case 101 so as to be movable (rotatable) in opening and closing directions depending on the outer diameters φA, φB and φC of the lens barrels 2, 2' and 2" illustrated in FIGS. 1, 4A and 4B.

The movable plates 110a and 110b respectively hold fixing screws (first and second connecting member) 107a and 107b having male screw portions 107a1 and 107b1. The movable plates 110a and 110b and the fixing screws 107a and 107b constitute a fixing connector (fixing member) enabling the case 101 to be fixed to the multiple lens barrels 2, 2' and 2" having mutually different outer diameters.

As illustrated in FIGS. 1 and 3, two female screw portions 211a and 211b are formed in the outer circumferential surface 204 of the lens barrel 2 at two circumferential areas on both sides of the contact-receiving portions 204a and 204b. The male screw portions 107a1 and 107b1 of the fixing screws 107a and 107b are respectively fastened to the female screw portions 211a and 211b, and thereby the fixing screws 107a and 107b are connected to the lens barrel 2. The connection of the fixing screws 107a and 107b held by the movable plates 110a and 110b to the lens barrel 2 fixes the case 101 (that is, the lens driving adapter 1) to the lens barrel 2.

In addition, the fastening of the fixing screws 107a and 107b to the female screw portions 211a and 211b causes a force pushing the case 101 to the lens barrel 2. Thereby, the contact portions 108a and 108b are pushed to the contact-receiving portions 204a and 204b on the outer circumferential surface 204 of the lens barrel 2, which maintains the mesh of the ring driving gear 106 with the driven gear 203 of the lens operation ring 202.

Although in this embodiment the fixing connector is constituted by using the fixing screws 107a and 107b as the connecting members, other connecting members may be used. It is desirable to use a fixing connector configured so as to generate a force pushing the case 101 to the lens barrel 2.

As described above, in the lens driving adapter 1 of this embodiment, the contact portions 108a and 108b each having the protruding shape are provided at two circumferential areas separate from each other. The contact portions 108a and 108b of the lens driving adapter 1 are contactable to any of the outer circumferential surfaces 204 (contact-receiving surfaces 204a and 204b) of the lens barrels 2, 2' and 2" whose outer diameters are mutually different, which are illustrated in FIGS. 2, 4A and 4B. These contact portions 108a and 108b form, when the lens driving adapter is attached to any of the outer circumferential surfaces 204 of the lens barrels 2, 2' and 2", a gap G between the outer circumferential surface 204 of the lens barrel to which the lens driving adapter 1 is attached and an intermediate area of the lens attachment surface 101a located between the contact portions 108a and 108b.

That is, the contact portions 108a and 108b have a protruding amount (height) from the lens attachment surface 101a set so as to prevent contact (interference) of the lens attachment surface 101a with the outer circumferential surface 204 of the lens barrel (2, 2' or 2"). Thus, the lens driving adapter 1 is stably attached, without causing a backlash, to the outer circumferential surfaces 204 of the lens barrels 2, 2' and 2" whose outer diameters are mutually different.

Furthermore, in the lens barrel 2 illustrated in FIG. 1, a curvature radius Rr of each of the contact-receiving portions 204a and 204b (that is, a radius of the outer circumferential surface 204) is set approximately equal to a radius of an addendum circle of the driven gear 203 and slightly larger than a radius Rp of a pitch circle of the driven gear 203. This relation also applies to the lens barrels 2' and 2" illustrated in FIGS. 4A and 4B. Thus, when the lens driving adapter 1 is attached to any of the lens barrels 2, 2' and 2", an inter-axis distance between the ring driving gear 106 and the driven gear 203 of the lens barrel to which the lens driving adapter 1 is attached does not almost change, in other words, is approximately fixed. Accordingly, this embodiment enables the lens driving adapter 1 to be attached to the lens barrels 2, 2' and 2" without significantly decreasing a meshing accuracy of these gears 106 and 203.

Embodiment 2

Figure 5:
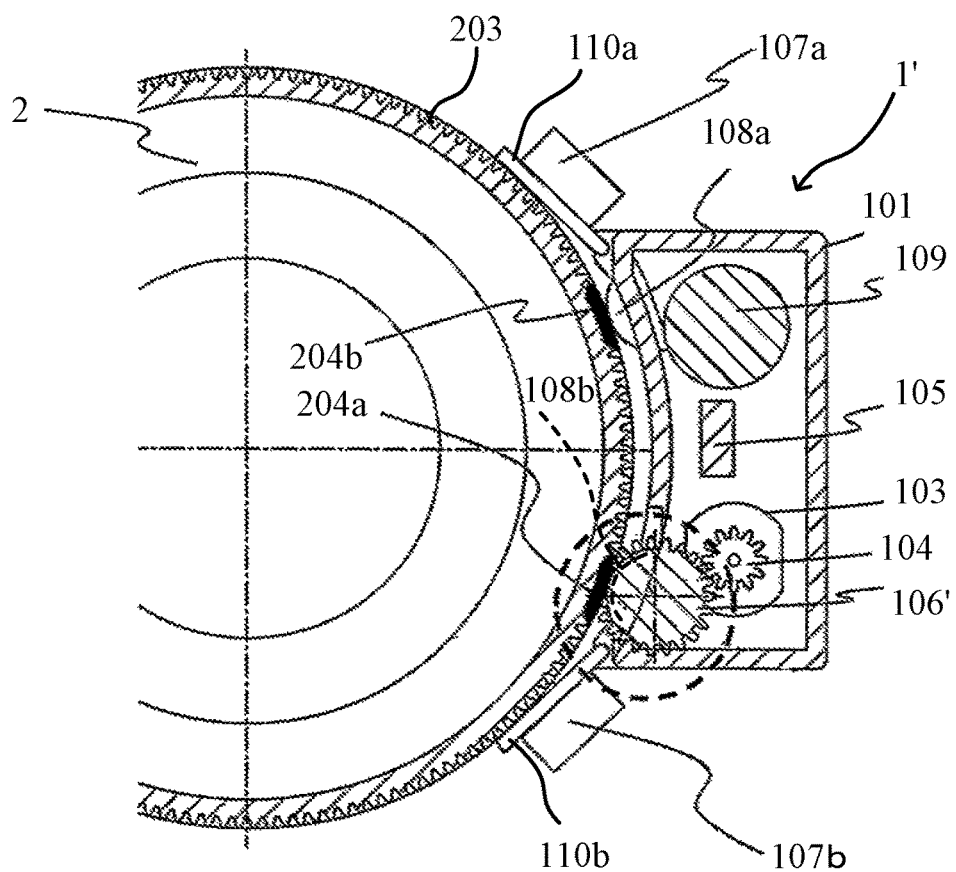
FIG. 5 is a sectional view of configurations of a lens driving adapter that is Embodiment 2 of the present invention and a lens barrel to which the lens driving adapter is attached.

FIG. 5 illustrates a lens driving adapter 1' that is a second embodiment (Embodiment 2) of the present invention and a lens barrel 2 to which the lens driving adapter 1' is attached, when cut in a direction orthogonal to an optical axis of the lens barrel 2. A basic configuration of the lens driving adapter 1' of this embodiment is identical to that of the lens driving adapter 1 of Embodiment 1, and constituent components common to those in Embodiment 1 are denoted by the same reference numerals as those in Embodiment 1.

In this embodiment, as surrounded by a dashed line in FIG. 5, one of the contact portions 108a and 108b (the contact portion 108b in this embodiment) and a ring driving gear 106' are arranged in the optical axis direction, in other words, are arranged such that the partial cylindrical surface of the contact portion 108b and the ring driving gear 106' are located at circumferential positions identical to each other.

With this configuration, when the lens driving adapter 1 is attached to any of the lens barrels 2, 2' and 2" illustrated in FIGS. 1, 4A and 4B, an inter-axis distance between the ring driving gear 106' and the driven gear 203 of the lens barrel to which the lens driving adapter 1 is attached is fixed. Accordingly, this embodiment enables the lens driving adapter 1 to be attached to the lens barrels 2, 2' and 2" without significantly decreasing a meshing accuracy of these gears 106' and 203.

Although this embodiment described the case where the lens driving adapter is attached to the lens barrel as the interchangeable lens, the lens driving adapter can be attached to a lens barrel of a lens-integrated camera (image capturing apparatus).

Each of the above-described embodiments achieves a lens driving adapter that can be widely attached to various lens barrels whose outer diameters are mutually different and can stably drive operation members of these lens barrels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-130653, filed on Jun. 30, 2015, which is hereby incorporated by reference herein in its entirety.

What is claimed is:

1. A lens driving adapter detachably attachable to a lens barrel on which an operation member is provided, the lens driving adapter comprising:
a driver configured to drive the operation member of the lens barrel to which the lens driving adapter is attached; and
an adapter body holding the driver,
wherein:
the adapter body includes a first contact portion and a second contact portion that are protrusions contactable with two circumferential portions in an outer circumferential surface of the lens barrel, the two circumferential portions being disposed at different positions away from the operation member;
the first and the second contact portions each have a shape that convexes toward the outer circumferential surfaces of the lens barrel; and
the adapter body includes a fixing member configured to fix the adapter body to the lens barrel.

2. The lens driving adapter according to claim 1, wherein the first and second contact portions form, when the lens driving adapter is attached to the lens barrel, a gap between the outer circumferential surface of the lens barrel and an intermediate area of the adapter body located between the first and second contact portions.

3. The lens driving adapter according to claim 1, wherein the first and second contact portions each have a partial cylindrical surface that extends in a direction along an optical axis of the lens barrel to which the lens driving adapter is attached.

4. The lens driving adapter according to claim 1, wherein the first and second contact portions are provided on a concave curved surface portion of the adapter body facing the lens barrel.

5. The lens driving adapter according to claim 1, wherein:
the driver includes a driving member configured to transmit a driving force to the operation member; and
the driving member is disposed between the first and second contact portions.

6. The lens driving adapter according to claim 1, wherein:
the driver includes a driving member configured to transmit a driving force to the operation member; and
the driving member and one of the first or second contact portion are arranged in a direction along an optical axis of the lens barrel to which the lens driving adapter is attached.

7. The lens driving adapter according to claim 1, wherein the fixing member includes:
a first movable member and a second movable member that are provided on circumferentially both sides of the adapter body and are movable with respect to the adapter body depending on the outer diameter of the outer circumferential surface of the lens barrel to which the lens driving adapter is attached; and
a first connecting member and a second connecting member that are respectively held by the first movable member and the second movable member and are configured to be connected with two circumferential portions of the outer circumferential surface of the lens barrel located on both sides of two circumferential areas with which the first and second contact portions make contact.

8. A lens apparatus comprising:
a lens barrel to which a lens driving adapter is detachably attachable; and
an operation member provided on the lens barrel,
wherein the lens driving adapter comprises:
a driver configured to drive the operation member of the lens barrel to which the lens driving adapter is attached; and
an adapter body holding the driver,
wherein:
the adapter body includes a first contact portion and a second contact portion that are protrusions contactable with two circumferential portions in an outer circumferential surface of the lens barrel, the two circumferential portions being disposed at different positions away from the operation member;

the first and the second contact portions each have a shape that convexes toward the outer circumferential surfaces of the lens barrel; and the adapter body includes a fixing member configured to fix the adapter body to the lens barrel.

9. An image capturing apparatus comprising:
a lens barrel to which a lens driving adapter is detachably attachable and on which an operation member is provided,
an image sensor configured to capture an object image formed by an image capturing optical system housed in the lens barrel,
wherein the lens driving adapter comprises:
   a driver configured to drive the operation member of the lens barrel to which the lens driving adapter is attached; and
   an adapter body holding the driver,
   wherein:
      the adapter body includes a first contact portion and a second contact portion that are protrusions contactable with two circumferential portions in an outer circumferential surface of the lens barrel, the two circumferential portions being disposed at different positions away from the operation member;

the first and the second contact portions each have a shape that convexes toward the outer circumferential surfaces of the lens barrel; and the adapter body includes a fixing member configured to fix the adapter body to the lens barrel.

10. The lens driving adapter according to claim 1, wherein the shape that convexes toward the outer circumferential surfaces of the lens barrel is a curved shape that convexes toward the outer circumferential surfaces of the lens barrel.

11. The lens apparatus according to claim 8, wherein the shape that convexes toward the outer circumferential surfaces of the lens barrel is a curved shape that convexes toward the outer circumferential surfaces of the lens barrel.

12. The image capturing apparatus according to claim 9, wherein the shape that convexes toward the outer circumferential surfaces of the lens barrel is a curved shape that convexes toward the outer circumferential surfaces of the lens barrel.

* * * * *